United States Patent [19]
Strong et al.

[11] Patent Number: 5,520,012
[45] Date of Patent: May 28, 1996

[54] CRUST FREEZER

[75] Inventors: John R. Strong, Kirkland; Jon A. Hocker, Bothell; Yvette L. Smith, Renton, all of Wash.

[73] Assignee: Frigoscandia Equipment AB, Helsingborg, Sweden

[21] Appl. No.: 422,536

[22] Filed: Apr. 14, 1995

[51] Int. Cl.$^6$ .................................................. F25D 25/04
[52] U.S. Cl. .................................... 62/380; 62/381
[58] Field of Search ........................................ 62/380, 381

[56]     References Cited

U.S. PATENT DOCUMENTS 4,139,992  2/1979  Fraser .......................................... 62/381
4,301,659  11/1981  Martin et al. ................................. 62/63
5,220,803  6/1993  Kiczek ........................................ 62/381

Primary Examiner—Ronald C. Capossela
Attorney, Agent, or Firm—Browdy and Neimark

[57]     ABSTRACT

An apparatus for stabilizing food products prior to freezing thereof comprises a frame defining a vertical channel. A plurality of rollers are rotatably mounted in the frame and form a substantially horizontal conveyor across the channel. The rollers are rotated in a direction providing conveyance of food products thereon. Cold gas is blown up through the channel and between the rollers, such that a thin bottom layer of each one of the food products is frozen during conveyance thereof on the rollers across the channel.

11 Claims, 4 Drawing Sheets

CRUST FREEZER

BACKGROUND OF THE INVENTION

1. Technical Field of the Invention

The present invention relates to an apparatus for stabilizing food products prior to freezing thereof.

2. Prior Art

Cold-air freezers using a relatively slow air flow are very cost-effective in that their energy consumption is relatively low. Freezers of this type are described in e.g. U.S. Pat. Nos. 4,603,776 and 4,953,365, the disclosures of which are incorporated herein by reference. The cooling rate in such freezers is moderate, but this is often no disadvantage because the internal heat conduction of the products to be frozen sets an upper limit to that rate. This is particularly true for thick products.

To some extent, the cooling rate can be increased by means of impingement freezing, i.e. high-speed cold-air jets that break through the air layer closest to the surface of the products to be frozen, thereby improving the heat transfer. Such an increased cooling rate may be highly beneficial for thin products, but requires a greater consumption of energy.

Increasing the heat transfer at the beginning of a freezing cycle results in a frozen crust forming quickly at the boundary of the product, which means less dehydration of the frozen products. Creating such a crust therefore increases the yield.

The use of impingement freezing in a cold-air freezer is described in U.S. Pat. No. 5,203,802. The disclosure of this patent is incorporated herein by reference. However, product quality for some products is still decreased as a consequence of product sticking to a conveyor belt, resulting in damage to the product at the outfeed end of the freezer when the product is lifted off the conveyor belt.

U.S. Pat. No. 5,156,008 describes a method of freezing a crust on food products by placing them on a firm support of such extremely low temperature that the products will not freeze on to the support. This method requires the use of cryogenic gases in order to give the support an adequately low temperature and, therefore, it is not very cost-effective.

OBJECT AND SUMMARY OF THE INVENTION

One object of the present invention is to provide an apparatus for stabilizing food products prior to final freezing thereof, such that dehydration during freezing is reduced and sticking of the products to a support during freezing is eliminated as well.

Another object of the invention is to provide such an apparatus for stabilizing food products prior to final freezing which is cost-effective and can easily be combined with a cold-air freezer having a moderate cooling rate.

According to the invention, these and other objects are achieved by an apparatus for stabilizing food products prior to final freezing thereof, which comprises a frame defining a vertical channel; a plurality of rollers rotatably mounted in said frame and forming a substantially horizontal conveyor across said channel; drive means for rotating said rollers in a direction providing conveyance of food products on said rollers across said channel; and means for blowing cold gas up through said channel and between said rollers, whereby a thin bottom layer of each one of the food products is frozen during conveyance thereof on said rollers across said channel.

The cold gas being blown up between the rollers in combination with the rotation of the rollers results in a quick formation of a frozen crust on the bottom surface of the products transported on the rollers across the channel. There is no tendency whatsoever of the products sticking to the rollers, which probably depends on the fact that the products are in contact only for a very short time with each one of the rollers conveying them. Thus, there is no time for a bond to form between the product and the rollers.

Each roller may, along its axis, have a plurality of through holes in several substantially radial directions. Thus, the cold gas blown through the channel also passes through these holes, which further increases the freezing rate and assists in preventing the products from freezing on to the rollers.

Preferably, the clearance between adjacent rollers is smaller than the diameter of the rollers, such that the gas blown up through the channel will form impingement curtains hitting the bottom surface of the products conveyed on the rollers. This quickly creates a frozen crust on the bottom side of the products.

In addition to achieving slot impingement by leaving a small clearance between the rollers, it is possible to have annular, e.g. semi-circular, grooves in the rollers. Two closely spaced rollers with identical annular grooves will essentially form a series of holes between the rollers. This offers a significant cleanability improvement over the use of through holes.

To form a corresponding frozen crust on the top side of the products, impingement means may be provided above the rollers for generating cold air jets directed substantially vertically down towards the rollers and the products transported thereon.

Thus, the crust freezer according to the invention is operated as a pre-freezer and provides an ideal freezer system when combined with a cold-air freezer of moderate freezing rate, e.g. a freezer which comprises a cooling battery, a foraminous conveyor belt following, along a part of its length, a helically extending path, and a fan for generating a circulating air flow through the cooling battery and the foraminous conveyor belt in the helically extending path.

However, the crust freezer according to the invention may be combined with other types of freezers, e.g. an IQF freezer. It may even be used as the bottom of a fluidization freezer.

DESCRIPTION OF THE PREFERRED EMBODIMENT

Figure 1:
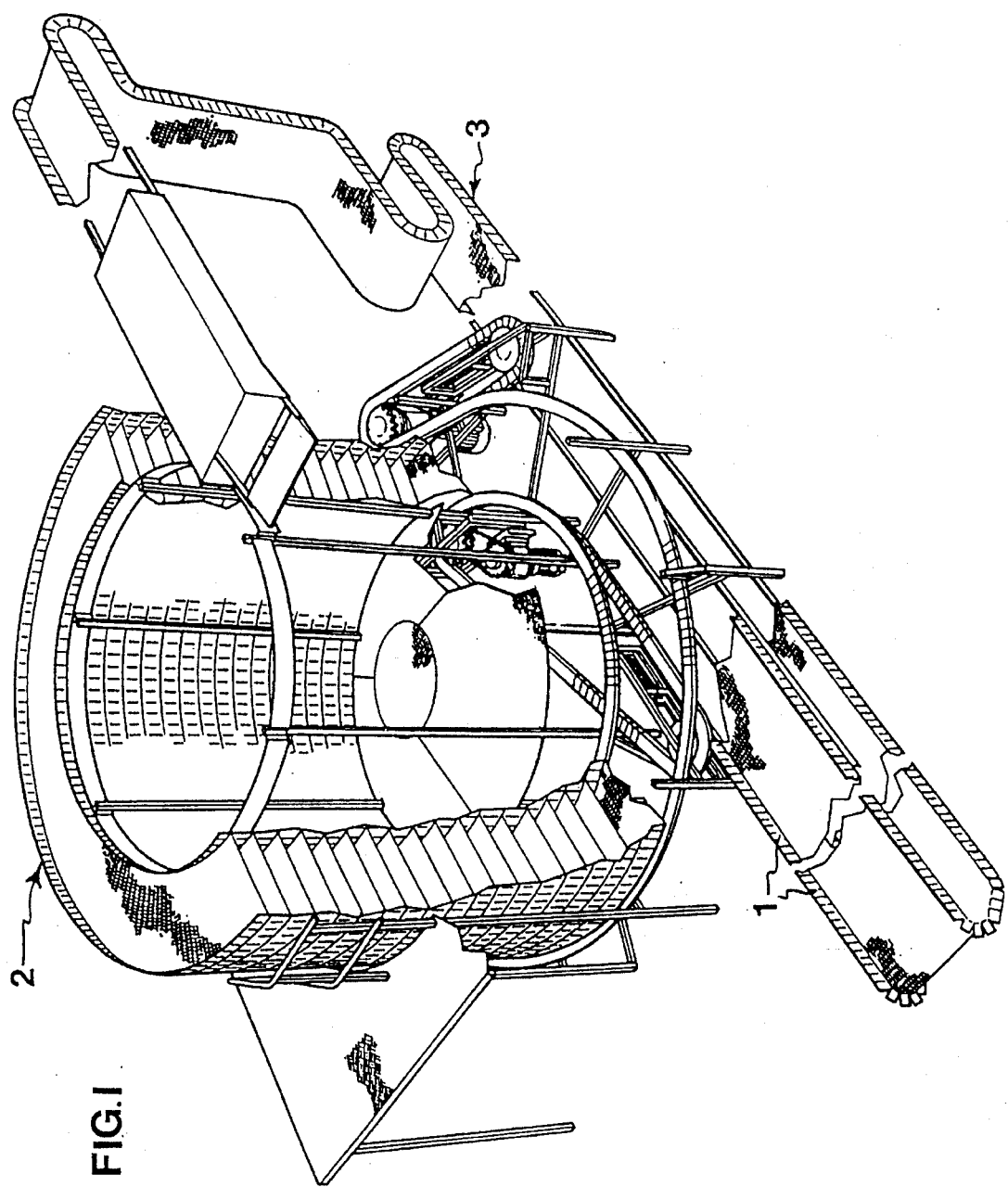
FIG. 1 is a perspective view of a prior-art conveyor in a cold-air freezer.

The prior-art conveyor shown in FIG. 1 comprises a conveyor belt 1 which is adapted to follow, along part of its length, a path consisting of a number of helically extending turns laid above each other in a pile 2. The conveyor belt is endless and extends from the upper end of the pile in a path 3 outside the pile 2 to the lower end thereof.

To be able to move helically, as shown in FIG. 1, the belt 1 comprises, in a manner known per se, a plurality of links. These extend in the lateral direction of the belt and are horizontally displaceable relative to each other in the longitudinal direction of the belt, such that the belt is turnable in the lateral direction. They are also vertically pivotable relative to each other about an axis parallel to the lateral direction. Thus, the belt 1 can follow an endless path as shown in FIG. 1, i.e. with straight portions and with curved portions through vertical and horizontal curves.

The conveyor belt illustrated in FIG. 1 is self-supporting at both longitudinal edges, but it could be self-supporting along only one of its longitudinal edges or even supported by helical rails along both longitudinal edges.

Figure 2:
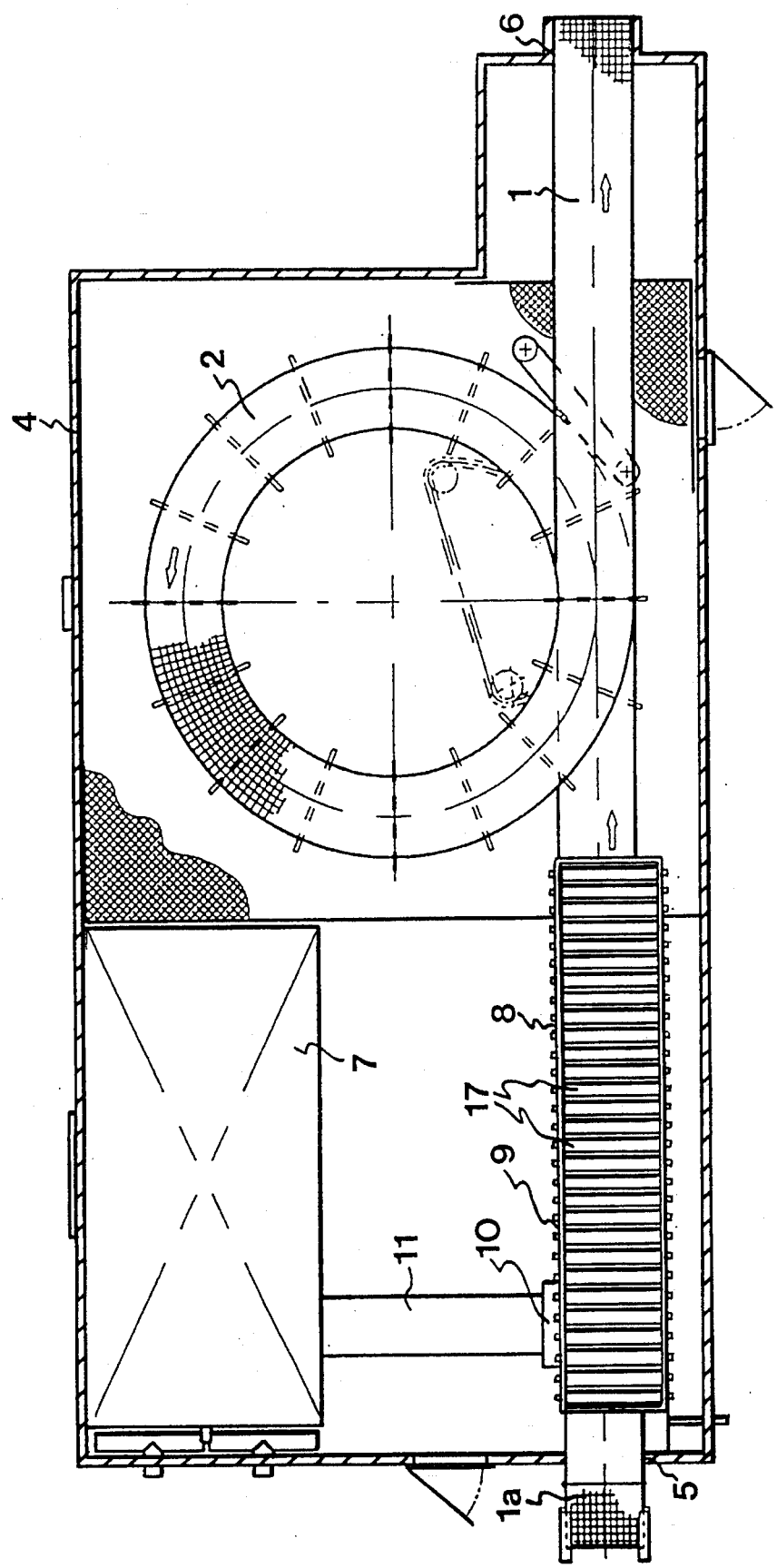
FIG. 2 is a plan view of a freezer according to FIG. 1 incorporating a pre-freezer according to one embodiment of the present invention.

As illustrated in FIG. 2, the pile 2 is enclosed in an insulated housing 4 having an inlet opening 5 and an outlet opening 6. The housing also accommodates an evaporator 7 forming a cooling battery. A pre-freezer 8 according to the present invention is inserted between the inlet opening 5 and the belt pile 2, such that products placed on a separate conveyor belt 1a at the inlet opening 5 are transferred to the pre-freezer 8 and transported by it further in the direction of travel of the conveyor belt 1, on to which the products are transferred for conveyance up the pile 2.

The pre-freezer 8 is mounted on top of a chamber 9 which accommodates at least one fan 10 connected to the evaporator 7 via a duct 11, such that the fan 10 generates an air flow from the evaporator 7 up through the pre-freezer 8 and from there through the belt pile 2 and back to the evaporator 7. The fan 10 may comprise the usual air blowing means of the prior-art cold-air freezer.

By the use of the duct 11, all of the air reaching the pre-freezer 8 will be dry cold air from the evaporator 7. By an appropriate design which minimizes mixing of air, the duct 11 can be eliminated. Instead, a separate fan would be needed that pressurizes the air blown up through the pre-freezer 8.

Figure 3:
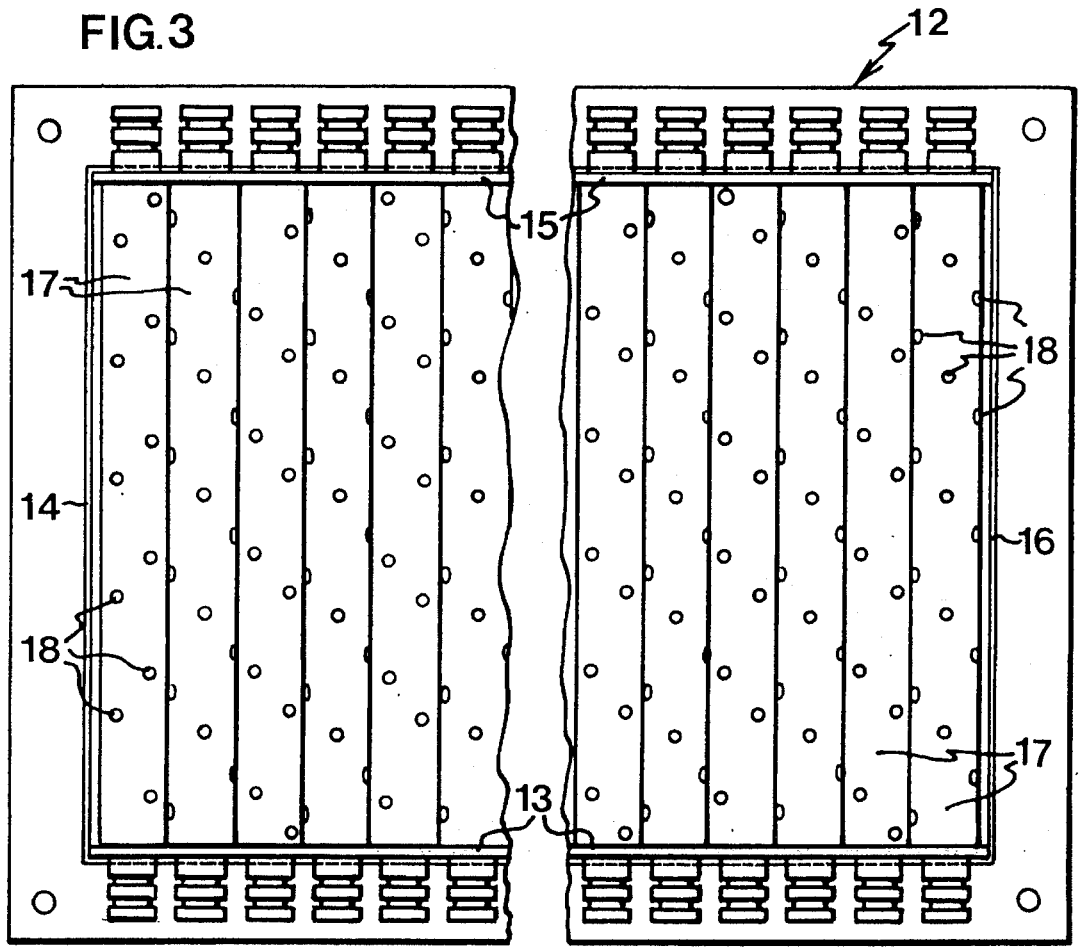
FIG. 3 is a plan view of the pre-freezer according to the present invention.
Figure 4:
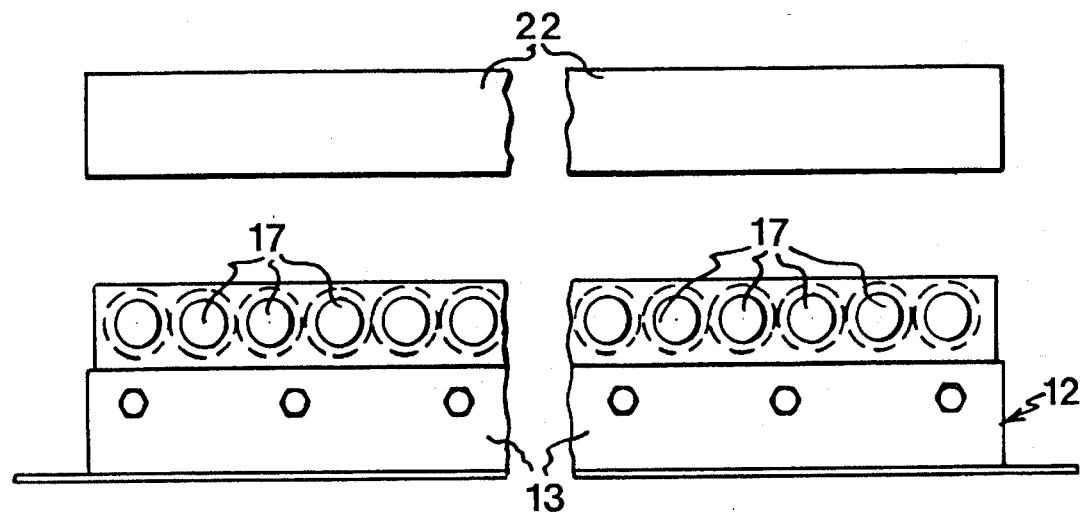
FIG. 4 is an elevational view of the pre-freezer in FIG. 3.

As illustrated in FIGS. 3 and 4, the pre-freezer comprises a frame 12 having four walls 13–16 forming a vertical channel. The top opening of the channel is restricted by a plurality of rollers 17 mounted in bearings in the opposite walls 13 and 15. The rollers 17 have parallel rotational axes and are coated with plastic. A slot or gap exists between the rollers 17 in each pair of adjacent rollers 17. The width of each such slot is smaller than the diameter of the rollers 17. Further, the clearance between adjacent rollers 17 is smaller than the length of the products to be treated by the pre-freezer. Typically, the clearance may amount to about 3% of the roller diameter, e.g. 0.2–2.0 mm for a roller diameter of about 30 mm.

Figure 6:
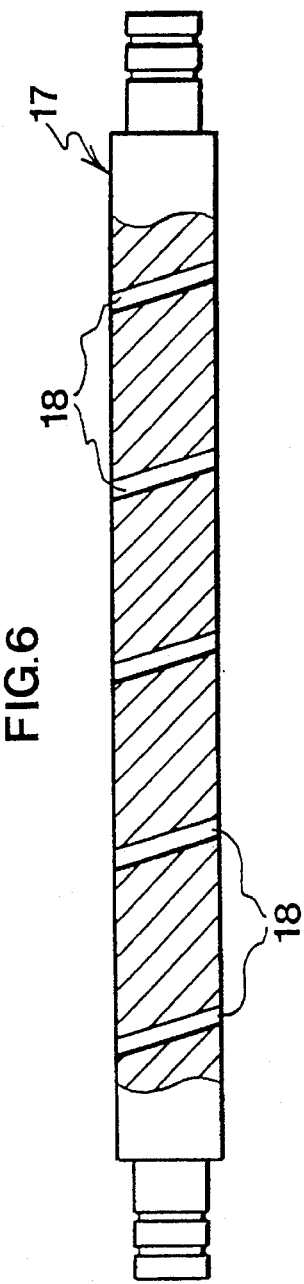
FIG. 6 is a sectional view of the roller along line VI—VI in FIG. 5.
Figure 5:
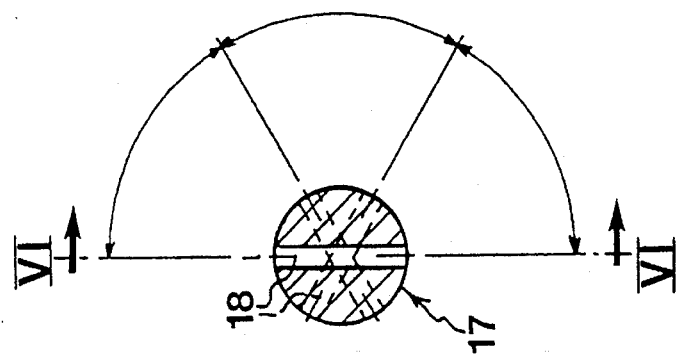
FIG. 5 is a vertical sectional view of a roller in the pre-freezer illustrated in FIGS. 3 and 4.

The rollers 17 may be solid or perforated. A perforated roller 17 is illustrated in FIGS. 5 and 6 and has a plurality of substantially radially directed through holes 18 distributed along the axis of the roller. The direction in a radial plane of each through hole 18 is shifted 60° from the adjacent through holes, as shown in FIG. 5. Further, the through holes 18 are inclined from a radial plane, as shown in FIG. 6, such that when the roller 17 in FIG. 6 is turned 180° the through holes 18 shift from the position shown to a position pointing upwards to the right.

Figure 7:
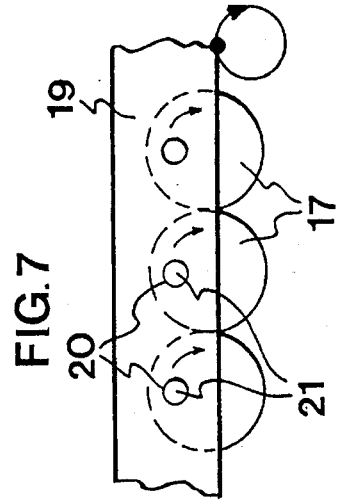
FIG. 7 is an elevational view schematically illustrating a drive device of a pre-freezer according to the present invention.

In FIG. 7, a drive device for the rollers 17 comprises a drive bar 19 oscillated in a circular path. The drive bar 19 has a row of holes 20, each receiving a crank pin 21 extending axially and eccentrically from a separate one of the rollers 17. If positively driven, the drive bar 19 is able to drive the rollers 17 from one side only.

In operation, the drive bar 19 drives the rollers 17 so as to rotate in synchronism while cold air is blown up through the channel formed by the frame 12 and forms air curtains through the slots between the rollers 17. Food products, e.g. fish filets or chicken parts, which are laid down on or transferred to the rollers 17 of the pre-freezer, will be conveyed by the rollers 17 while a fraction of the weight of the products is supported by the upwardly directed air curtains, which also may have the effect of impingement jets. Thus, the products may have a tendency to float across the rollers 17 instead of riding on them.

Impingement from above, as schematically illustrated in FIG. 4, by an ordinary impingement device 22 may be used to balance the forces exerted by the upwardly directed air curtains. Such an optional impingement device would also be advantageous in that it could create a frozen crust on the top side of the products at the same time as such a crust is formed on the bottom side of the products by the cold air of the air curtains. The time for crust freezing may be as short as 10–20 seconds.

When transferred to the conveyor belt 1 in FIG. 2, the products will have no tendency to adhere to the conveyor surface, and the conveyor will not form any marks on the products. This is a consequence of the hardened bottom surface of the products, which also will significantly reduce the dehydration of the products when passing through the belt pile 2 for final freezing.

During operation, frost accumulating on the rollers may easily be removed therefrom by simple scrapers engaging the rollers from underneath.

Obviously, many modifications and variations of the present invention are made conceivable in the light of the above teachings. Thus, the rollers 17 may be build from solid plastic instead of from a metallic tubing coated with plastic. Further, the rollers 17 may be used for non-linear and/or variable speed movement of the products. Also, the separate conveyor belt 1a may be dispensed with and the pre-freezer 8 be extended outside the inlet opening 5. Finally, the pre-freezer 8 may make an angle with the conveyor belt 1, such that the width of the rollers 17 can differ from the width of the conveyor belt 1. It is therefore to be understood that the invention may be practiced otherwise than as specifically described, within the scope of the appended claims.

What is claimed is:

1. An apparatus for stabilizing food products prior to freezing thereof, comprising a frame defining a vertical channel, a plurality of rollers rotatably mounted in said frame and forming a substantially horizontal conveyor across said channel, drive means for rotating said rollers in a direction providing conveyance of food products on said rollers across said channel, means for blowing cold gas up through said channel and between said rollers, whereby a thin bottom layer of each one of the food products is frozen during conveyance thereof on said rollers across said channel.

2. An apparatus as claimed in claim 1, wherein the rollers have substantially parallel rotational axes.

3. An apparatus as claimed in claim 1, wherein a clearance between adjacent rollers is smaller than the diameter of each roller.

4. An apparatus as claimed in claim 3, wherein the rollers have annular grooves.

5. An apparatus as claimed in claim 1, wherein a peripheral surface layer of said rollers consists of plastic.

6. An apparatus as claimed in claim 1, wherein each roller at one end has a crank pin and the drive means comprises an oscillating drive bar engaging the crank pin of each roller.

7. An apparatus as claimed in claim 1, wherein the gas is air.

8. An apparatus as claimed in claim 1, wherein each roller along its axis has a plurality of through holes in several substantially radial directions, whereby the cold gas blown through said channel also passes through said roller holes.

9. An apparatus as claimed in claim 1, further comprising impingement means for generating cold air jets directed substantially vertically down towards the rollers.

10. A freezer system, comprising an apparatus as claimed in claim 1 operating as a pre-freezer to a freezer comprising a cooling battery, a foraminous conveyor belt following, along a part of its length, a helically extending path, and a fan for generating a circulating air flow through said cooling battery and said foraminous conveyor belt in said helically extending path.

11. A freezer system as claimed in claim 10, wherein said fan comprises said means for blowing cold gas up through the channel.

* * * * *